United States Patent
Winter

(10) Patent No.: US 9,099,722 B2
(45) Date of Patent: Aug. 4, 2015

(54) RECOMBINATOR FOR FLOWING ELECTROLYTE BATTERY

(75) Inventor: Alexander Rudolf Winter, Queensland (AU)

(73) Assignee: Redflow R&D Pty Ltd., Queensland (AU)

(*) Notice: Subject to any disclaimer, the term of this patent is extended or adjusted under 35 U.S.C. 154(b) by 268 days.

(21) Appl. No.: 13/503,191

(22) PCT Filed: Oct. 22, 2010

(86) PCT No.: PCT/AU2010/001413
§ 371 (c)(1),
(2), (4) Date: Apr. 20, 2012

(87) PCT Pub. No.: WO2011/047441
PCT Pub. Date: Apr. 28, 2011

(65) Prior Publication Data
US 2012/0202095 A1 Aug. 9, 2012

(30) Foreign Application Priority Data

Oct. 23, 2009 (AU) .............................. 2009905192

(51) Int. Cl.
| | |
|---|---|
| H01M 8/18 | (2006.01) |
| H01M 10/42 | (2006.01) |
| H01M 8/04 | (2006.01) |
| H01M 12/08 | (2006.01) |
| H01M 2/40 | (2006.01) |

(52) U.S. Cl.
CPC .......... *H01M 8/188* (2013.01); *H01M 8/04186* (2013.01); *H01M 8/04798* (2013.01); *H01M 2/40* (2013.01); *H01M 8/04276* (2013.01); *H01M 10/4214* (2013.01); *H01M 12/085* (2013.01); *H01M 2300/0005* (2013.01)

(58) Field of Classification Search
CPC . H01M 12/085; H01M 2/40; H01M 8/04276; H01M 10/4214; H01M 2300/0005; H01M 8/188; H01M 80/04798
USPC .................................................... 429/51, 451
See application file for complete search history.

(56) References Cited

U.S. PATENT DOCUMENTS

| | | | |
|---|---|---|---|
| 4,386,140 A | 5/1983 | Bjorkman, Jr. | |
| 4,400,446 A | 8/1983 | Hacha | |
| 4,414,292 A | 11/1983 | Kiwalle et al. | |
| 4,540,639 A * | 9/1985 | Grimes | 429/402 |
| 5,628,887 A * | 5/1997 | Patterson et al. | 204/241 |
| 6,455,187 B1 * | 9/2002 | Tomazic | 429/72 |
| 6,864,012 B2 | 3/2005 | Tomazic | |
| 2003/0113615 A1 * | 6/2003 | Tomazic | 429/70 |

OTHER PUBLICATIONS

PCT International Search Report dated Dec. 9, 2010 for PCT/AU2010/001413, from which the instant application is based.

(Continued)

*Primary Examiner* — Jeremiah Smith
(74) *Attorney, Agent, or Firm* — Fredrikson & Byron, P.A.

(57) ABSTRACT

A recombinator for a flowing electrolyte battery comprises a housing defining a reaction chamber for receiving a halogen source and a hydrogen source. A catalyst is located within the reaction chamber to catalyze the formation of hydrogen halide from the halogen source and the hydrogen source and substantially all of the halogen source, hydrogen source and hydrogen halide within the reaction chamber are maintained in gaseous form.

20 Claims, 3 Drawing Sheets

(56) References Cited

OTHER PUBLICATIONS

PCT Written Opinion dated Dec. 9, 2010 for PCT/AU2010/001413, from which the instant application is based.

PCT Demand of Mar. 28, 2011 for PCT/AU2010/001413, from which the instant application is based.

PCT International Preliminary Report on Patentability dated Apr. 18, 2011 for PCT/AU2010/001413, from which the instant application is based.

* cited by examiner

RECOMBINATOR FOR FLOWING ELECTROLYTE BATTERY

RELATED APPLICATIONS

This application is a 35 U.S.C. 371 national stage filing from, and claims priority to, International Application No. PCT/AU2010/001413 filed Oct. 22, 2010, which claims priority to Australian Application No. 2009905192 filed Oct. 23, 2009, the teachings of which are incorporated herein by reference.

FIELD OF THE INVENTION

The present invention relates to flowing electrolyte batteries. In particular, although not exclusively, the invention relates to a recombinator for a flowing electrolyte battery.

BACKGROUND TO THE INVENTION

Batteries used in stand alone power supply systems are commonly lead-acid batteries. However, lead-acid batteries have limitations in terms of performance and environmental safety. For example, typical lead-acid batteries often have very short lifetimes in hot climate conditions, especially when they are occasionally fully discharged. Lead-acid batteries are also environmentally hazardous, since lead is a major component of lead-acid batteries and presents environmental challenges during manufacturing and disposal.

Flowing electrolyte batteries, such as zinc-bromine batteries, zinc-chlorine batteries, and vanadium flow batteries, offer the potential to overcome the above mentioned limitations of lead-acid batteries. In particular, the operational lifetime of flowing electrolyte batteries is not affected by deep discharge applications, and the energy to weight ratio of flowing electrolyte batteries is up to six times higher than that of lead-acid batteries.

A flowing electrolyte battery, like a lead acid battery, comprises a stack of cells that produce a total voltage higher than that of individual cells. But unlike a lead acid battery, cells in a flowing electrolyte battery are hydraulically connected through an electrolyte circulation path.

Referring to FIG. 1, a flow diagram illustrates a basic zinc-bromine flowing electrolyte battery 100, as known according to the prior art. The zinc-bromine battery 100 includes a negative electrolyte circulation path 105 and an independent positive electrolyte circulation path 110. The negative electrolyte circulation path 105 contains zinc ions as an active chemical, and the positive electrolyte circulation path 110 contains bromine ions as an active chemical. The zinc-bromine battery 100 also, comprises a negative electrolyte pump 115, a positive electrolyte pump 120, a negative zinc electrolyte (anolyte) tank 125, and a positive bromine electrolyte (catholyte) tank 130. A complexing agent is generally added to the bromine electrolyte to form a polybromide complex that reduces the reactivity and vapour pressure of elemental bromine.

To achieve high voltage, the zinc-bromine battery 100 further comprises a stack of cells connected in a bipolar arrangement. For example, a cell 135 comprises half cells 140, 145 including a bipolar electrode plate 155 and a micro porous separator plate 165. The zinc-bromine battery 100 then has a positive polarity end at a collector electrode plate 160, and a negative polarity end at another collector electrode plate 150.

A chemical reaction in a positive half cell, such as the half cell 145, during charging can be described according to the following equation:

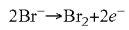

$$2Br^- \rightarrow Br_2 + 2e^- \quad \text{Eq. 1}$$

Bromine is thus formed in half cells in hydraulic communication with the positive electrolyte circulation path 110 and is then stored in the positive bromine electrolyte tank 130. A chemical reaction in a negative half cell, such as the half cell 140, during charging can be described according to the following equation:

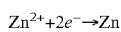

$$Zn^{2+} + 2e^- \rightarrow Zn \quad \text{Eq. 2}$$

A metallic zinc layer 170 is thus formed on the collector electrode plate 150 in contact with the negative electrolyte circulation path 105. Chemical reactions in the half cells 140, 145 during discharging are then the reverse of Eq. 1 and Eq. 2.

All batteries employing aqueous electrolyte solutions will produce some hydrogen gas and hydroxide ions due to the electrolysis of water. If the hydrogen is allowed to escape the system then the pH of the electrolyte will eventually rise to the point where solid deposits can precipitate resulting in sub-optimal battery performance.

To combat this effect recombinator devices may be used to return the gaseous molecular hydrogen back into the circulating electrolyte stream as hydrogen ions and so prevent significant pH rises. Recombinators employ precious metal catalysts, such as platinum, to accelerate the reaction of hydrogen and bromine gases to form hydrobromic acid, thereby re-acidifying the system. The recombinator will be in fluid communication with a gas handling unit which receives gases produced in the electrode stacks and monitors and controls gas pressures.

When employing a recombinator great care must be taken to ensure the precious metal catalyst contained therein is unable to enter the electrolyte stream, which would lead to the catalyst plating out on the zinc electrodes and thus reducing battery performance and leading to loss of hydrogen ions. Further, the catalyst is generally maintained at elevated temperatures during operation to ensure it stays dry for optimal continuing performance. If the catalyst is subsequently allowed to cool in the presence of reactants, for example when the battery is not in use, it will continue producing hydrobromic acid, albeit at a lower rate. Eventually the catalyst will become saturated with this acidic liquid which can damage the catalyst resulting in a loss of performance and entry of catalyst material into the electrolyte stream.

A further problem with prior art recombinators is that the rate and efficiency of the return of hydrogen ions back into the system is generally limited by the availability of bromine for reaction. As mentioned above, the bromine in the system is usually complexed with a suitable complexing agent to reduce its vapour pressure, thereby resulting in a low bromine partial pressure in the system. However, that can lead to an insufficient amount of bromine to achieve an acceptable reaction rate within the recombinator.

OBJECT OF THE INVENTION

It is therefore an object of the invention to overcome or alleviate at least one of the aforementioned deficiencies in the prior art or at least provide a useful or commercially attractive alternative.

SUMMARY OF THE INVENTION

In one form, although it need not be the only or indeed the broadest form, the invention resides in a recombinator for a flowing electrolyte battery comprising:

a housing defining a reaction Chamber for receiving a halogen source and a hydrogen source; and a catalyst within the reaction chamber to catalyse the formation of hydrogen halide from the halogen source and the hydrogen source;

wherein substantially all of the halogen source, hydrogen source and hydrogen halide within the reaction chamber are in gaseous form.

A portion of the halogen source may be produced by exposing a halogen containing electrolyte to an evaporator.

Preferably, the halogen source is a bromine source and the hydrogen halide is hydrogen bromide.

If required, a portion of the bromine source may be produced by exposing a bromine containing electrolyte to a bromine evaporator.

Preferably, the bromine containing electrolyte is a bromine rich electrolyte.

The housing may further comprise a recombinator inlet and a recombinator outlet.

Suitably, the bromine source and hydrogen source are drawn into the reaction chamber through the recombinator inlet and the hydrogen halide is drawn out of the reaction chamber through the recombinator outlet due to a pressure differential generated by the flow of electrolyte past an open end of the reaction chamber outlet.

Preferably, the flow of electrolyte past the open end of the recombinator outlet is achieved with a zinc electrolyte pump.

The flowing electrolyte battery is a zinc-halide flowing electrolyte battery such as a zinc-bromine or zinc-chlorine flowing electrolyte battery.

In a second form the invention resides in a method of regulating the pH of an electrolyte stream within a flowing electrolyte battery including the steps of:

(a) introducing a halogen source and a hydrogen source into a recombinator, the recombinator comprising a catalyst to catalyse the formation of hydrogen halide from the halogen source and the hydrogen source; and (b) removing the hydrogen halide formed and introducing it into the electrolyte stream to thereby regulate the pH of the electrolyte stream within the flowing electrolyte battery, wherein substantially all of the halogen source, hydrogen source and hydrogen halide within the reaction chamber are in gaseous form.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

Figure 1:
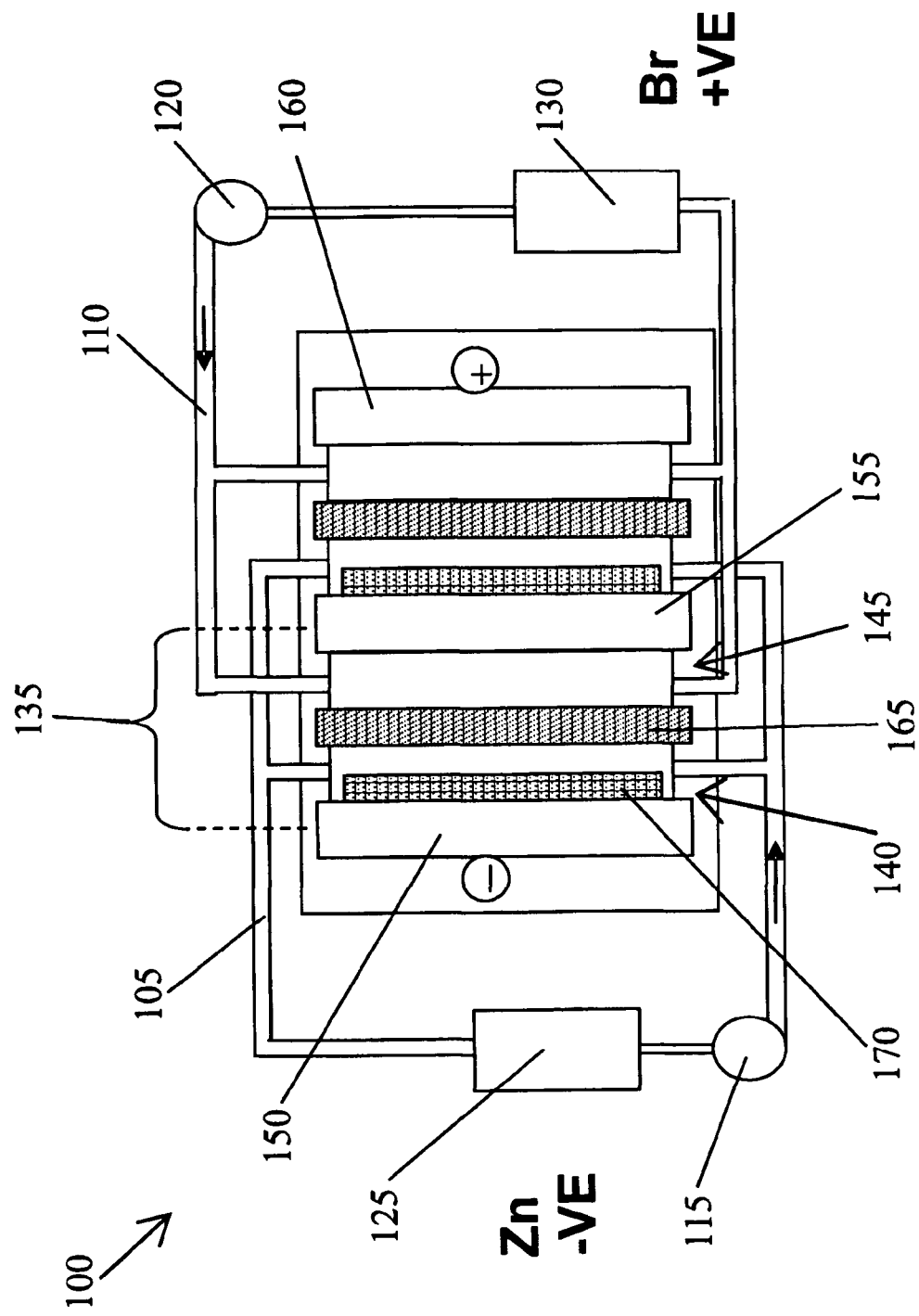
FIG. 1 is a diagram illustrating a basic prior art zinc-bromine flowing electrolyte battery.

Those skilled in the art will appreciate that minor deviations from the symmetrical layout of components as illustrated in the drawings will not detract from the proper functioning of the disclosed embodiments of the present invention.

DETAILED DESCRIPTION OF THE INVENTION

Embodiments of the present invention comprise a recombinator and an evaporator for a flowing electrolyte battery. Elements of the invention are illustrated in concise outline form in the drawings, showing only those specific details that are necessary for understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

Figure 2A:
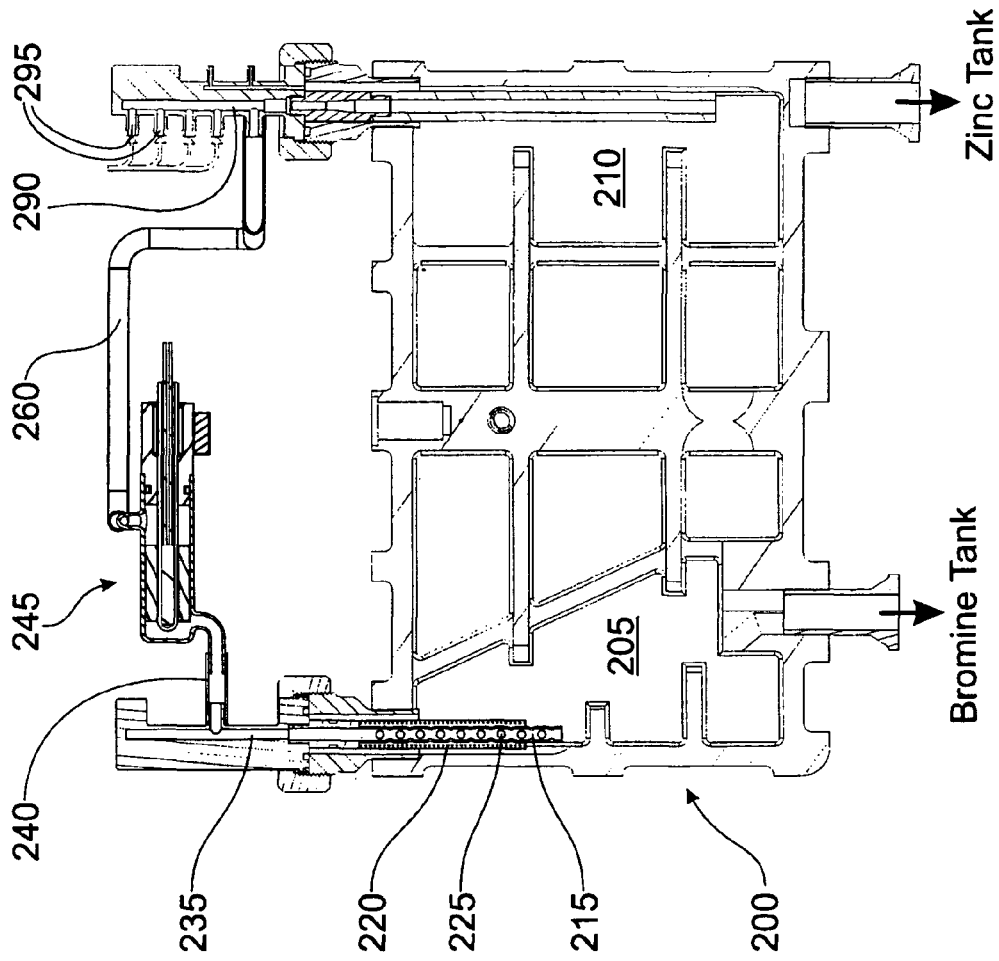
FIG. 2A is a sectional view of a gas handling unit, including recombinator, of a flowing electrolyte battery, according to an embodiment of the present invention.

As shown in FIG. 2A, a gas handling unit 200 comprises a bromine electrolyte gas space 205 and a zinc electrolyte gas space 210 which receive vapour from a bromine electrolyte tank and a zinc electrolyte tank (not shown in the figures), respectively. Extending into bromine electrolyte gas space 205 is a bromine evaporator comprising an optional bromine evaporator core 215 which is at least partially encased by a mesh 220. Bromine evaporator core 215, in the embodiment shown, takes the form of an elongate tube, with an open first end, with apertures 225 formed therein and a heating element within its core that can be heated to operating temperatures up to about 100° C.

Bromine evaporator core 215 may be formed from a range of materials, such as ceramics, glass and plastics which are capable of being maintained at elevated temperatures for extended periods of time and which are not significantly degraded by the atmosphere within the zinc-bromine battery. In one embodiment, bromine evaporator core 215 takes the form of a plastic tube having uniformly distributed apertures 225 distributed therein.

Mesh 220 may be formed from glass fibres, plastic fibres, sintered plastic beads, plastic beads encased within a glass fibre sock or a ceramic sleeve so long as a suitably large surface area is presented. In the embodiment shown in the figures, mesh 220 is formed from a glass fibre sock.

Figure 2B:
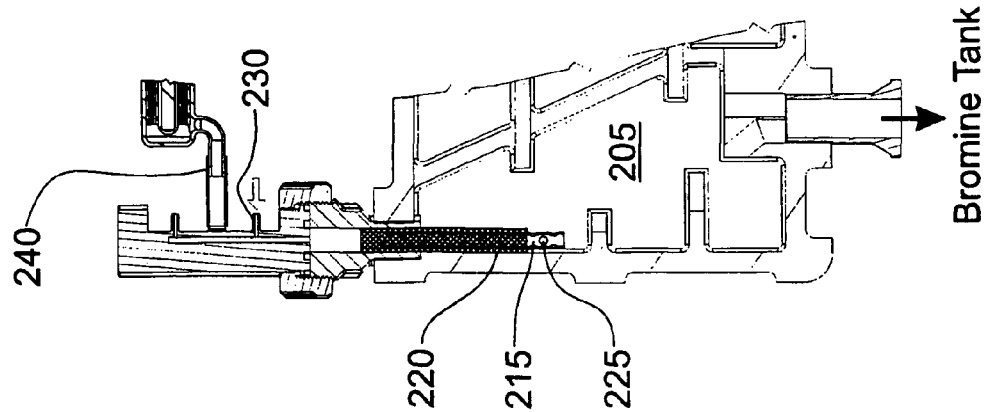
FIG. 2B is a further sectional view of the gas handling unit shown in FIG. 2A, focusing on a bromine evaporator, according to an embodiment of the present invention.

As can be seen in FIG. 2B, which is a slightly different sectional view of gas handling unit 200 shown in FIG. 2A, a supply of high bromine concentration electrolyte is introduced onto mesh 220 via bromine supply line 230, indicated by an arrow in FIG. 2B. Mesh 220 may be heated by bromine evaporator core 215 and acts to create a large surface area to improve the rate of evaporation of said high bromine concentration electrolyte. The bromine rich vapour can then pass through apertures 225 up the hollow interior of bromine evaporator core 215 and into a vapour line 235 which is continuous with said hollow interior. Bromine evaporator core 215 thus serves as a selective physical barrier to prevent the ingress of liquid electrolyte up vapour line 235, and hence into recombinator 245, but allow the efficient passage of bromine rich vapour. Vapour line 235 is intersected by a recombinator inlet 240, and is continuous with same, thereby enabling the bromine rich vapour to enter recombinator 245.

Figure 3:
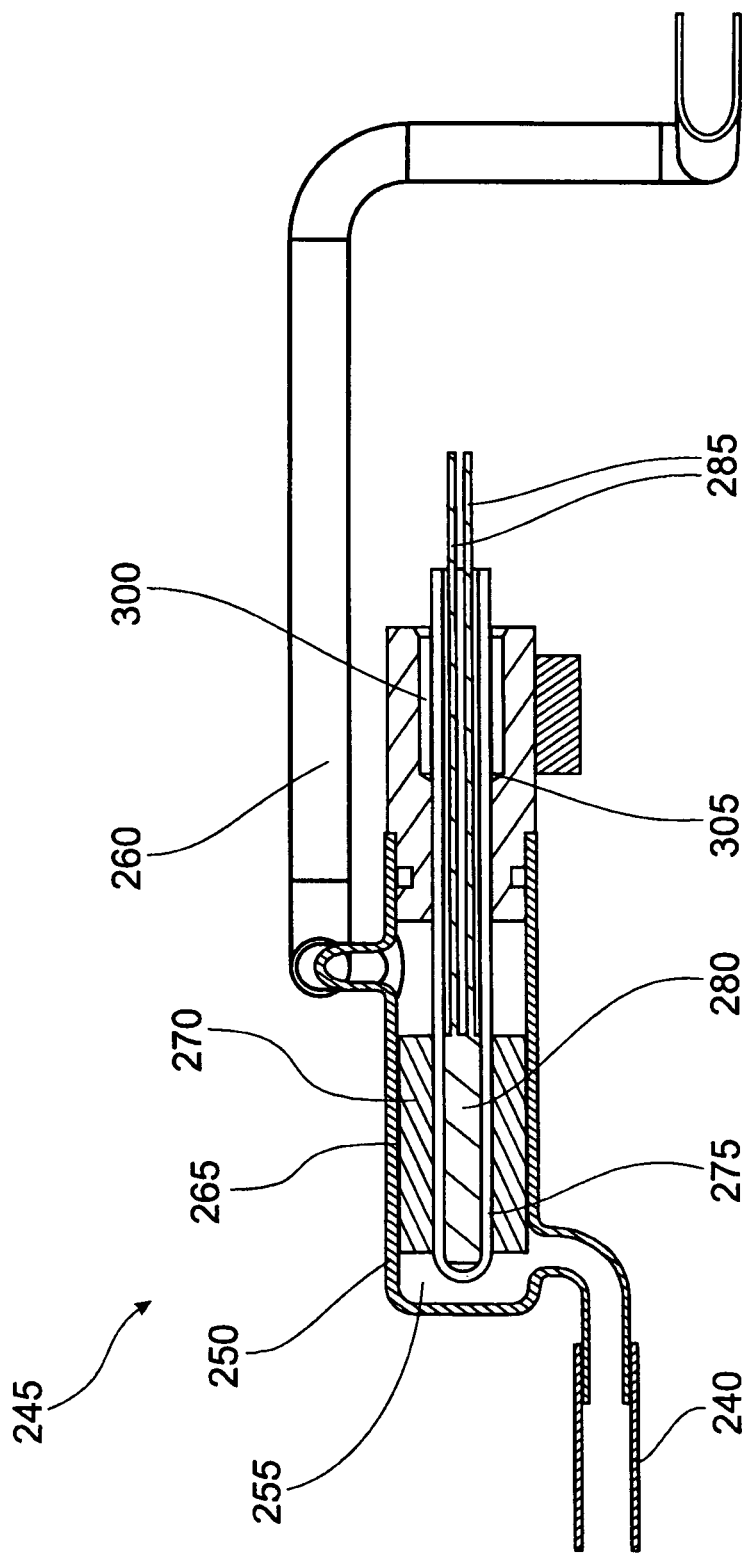
FIG. 3 is a sectional view of the recombinator shown in FIG. 2A.

Referring now to FIG. 3, recombinator 245 comprises a housing 250 which defines a reaction chamber 255 within its interior. Reaction chamber 255 is continuous with recombinator inlet 240 and a recombinator outlet 260. Reaction chamber 255 contains a catalyst 265 disposed on the surface of a substrate 270. Catalyst 265 may be selected from any material which is effective at catalysing the conversion of gaseous bromine and hydrogen into hydrogen bromide. Typically, catalyst 265 will be selected from precious metals and precious metal alloys such as platinum, ruthenium, palladium and rhodium. Preferably, catalyst 265 is formed from a suitable combination of one or more of these elements bonded to the surface of substrate 270.

Substrate 270 provides a physical support for catalyst 265 and is preferably manufactured from a ceramic material such as alumina $Al_2O_3$), ($SiO_2$ or MgO. Preferably, substrate 270 is constructed from alumina. It is preferred, although not essential, that substrate 270 is porous and thereby presents a larger surface area for the deposition of catalyst 265 as this provides for faster reactions rates.

Substrate 270 surrounds a heating tube 275 which contains a heating element 280. Heating tube 275 is impermeable to the vapours within reaction chamber 255 to prevent the ingress of hydrogen bromide/hydrobromic acid which could damage heating element 280. Heating tube 275 is constructed from materials which are impermeable to the vapours discussed and have reasonable thermal conduction properties such as glass or ceramics such as $Al_2O_3$, $SiO_2$ and MgO.

Heating element 280 sits within and substantially fills the volume of heating tube 275 and enables heating tube 275 to attain catalyst temperatures of between 130° C. to 250° C. Heating catalyst 265 in this manner both further increases the rate of the hydrobromic acid forming reaction and keeps catalyst 265 dry to reduce the chances of it becoming saturated with corrosive liquid hydrobromic acid. Heating element 280 is connected to a power source via electrical connectors 285. Heating tube 275 and hence heating element 280 and electrical connectors 285 pass through a plug 300, which may take the form of a Teflon plug, to keep reaction chamber 255 airtight. Plug 300 may be inserted into recombinator 245 with a seal 305, such as an O-ring, to ensure sealing engagement.

Referring back to FIG. 2A, recombinator outlet 260 is seen to emerge from recombinator 245 on an opposite side to recombinator inlet 240 and enables the minimal amounts of unreacted hydrogen and bromine, as well as the newly formed hydrogen bromide/hydrobromic acid, to exit reaction chamber 255. Recombinator outlet 260 connects with a discharge tube 290 which, at its lower extent, ends in zinc electrolyte gas space 210. At its upper extent discharge tube 290 is seen to be intersected by one or more electrolyte flow tubes 295 and so electrolyte being returned to the zinc electrolyte tank via flow tubes 295 (indicated by arrows in FIG. 2A) and discharge tube 290 is allowed to mix with the products exiting reaction chamber 255 through recombinator outlet 260. The electrolyte is caused to be returned to the zinc electrolyte tank through discharge tube 290 by the action of a zinc electrolyte pump (not shown in the figures).

The role of the various components described will now be discussed in relation to the operation of the zinc-bromine battery. In use, the zinc electrolyte pump will be operational and so electrolyte which has passed through the electrode stack or through a bypass tube is returned to zinc electrolyte gas space 210 and then the zinc electrolyte tank by being pumped through electrolyte flow tubes 295 and into discharge tube 290. At this point, under the action of gravity as well as the influence of the pump, electrolyte is flowing down discharge tube 290, past the point where it is intersected by recombinator outlet 260, and is returned to the zinc electrolyte tank. This flow action down discharge tube 290 creates a pressure differential and means that the pressure at the upper extent of discharge tube 290, in the region of its connection with recombinator outlet 260, is lower than that at its lower extent in zinc electrolyte gas space 210. This region of low pressure creates a driving force to actively draw the gaseous contents, and any minor amounts of condensate which may form, out of recombinator outlet 260 and into discharge tube 290 to be returned into the zinc electrolyte tank to maintain the correct pH balance within the zinc-bromine battery.

This low pressure driving force generated within discharge tube 290 is transmitted back along recombinator outlet 260, through recombinator 245, recombinator, inlet 240 and into vapour line 235. In this manner bromine containing vapour is drawn into vapour line 235, through apertures 225 in bromine evaporator core 215. Due to the complexing agent present within the bromine electrolyte tank the vapour pressure of bromine within bromine electrolyte gas space 205 may not be particularly high. To supplement this and provide a sufficient concentration of available bromine to recombinator 245 a small stream of high bromine concentration electrolyte is introduced onto bromine evaporator core 215 from bromine supply line 230, as previously described, and is subsequently vaporised and enters vapour line 235. Although not shown in the figures, bromine supply line 230 takes the form of a small bypass tube originating from the bromine pump and receiving its bromine rich electrolyte supply therefrom.

The driving force discussed thus results in a bromine rich vapour being drawn into vapour line 235 via the open end of said vapour line 235 and apertures 225 provided in bromine evaporator core 215. The vapour then travels through recombinator inlet 240 and enters reaction chamber 255 within recombinator 245. Hydrogen gas, produced by reactions at the electrode stacks, is not very soluble in the aqueous electrolytes and so it will exist almost exclusively in the gaseous form distributed throughout the zinc-bromine battery but particularly accumulating within the bromine and zinc electrolyte gas spaces 205 and 210, respectively. Hydrogen gas is able to enter recombinator via bromine evaporator core 215 as previously described in relation to the bromine vapour.

Once inside reaction chamber 255 the gaseous hydrogen and bromine come into contact with catalyst 265 disposed on the surface of substrate 270 which is heated by heating tube 275 containing heating element 280. Catalyst 265 speeds up the conversion of hydrogen and bromine into hydrogen bromide which, upon dissolving in an aqueous environment either in condensed vapour within recombinator outlet 260 or in electrolyte within discharge tube 290, forms hydrobromic acid. Maintaining catalyst 265 at an elevated temperature aids in keeping it dry, so reducing the likelihood of a build up of corrosive liquids on its surface. The resultant hydrogen bromide formed by the action of catalyst 265 is then drawn into recombinator outlet 260 and into discharge tube 290, as previously described.

In this manner, so long as the zinc electrolyte pump is operational to create a pressure gradient in discharge tube 290, there will be a constant flow of gaseous hydrogen and bromine into recombinator 245 and of hydrogen bromide out thereof to eventually be discharged into the zinc electrolyte tank. When the zinc electrolyte pump is not operational then the driving force will be lost and no further gaseous reactants will flow into reaction chamber 255. This allows heating element 280 to be turned off to conserve power and improve operational safety without the risk of continued wetting and potential corrosion of catalyst 265.

This design is a distinct advantage over prior art recombinators which cannot stop the flow of reactants to the recombinator. This reactant flow will continue to occur at a slower rate when the battery is not operational but eventually the catalyst and substrate will become wet with HBr which can then transport traces of catalyst back into the electrolyte circuit. Prior art recombinators employ a liquid flow into and out of the recombinator. This forms an unbroken flow path whereby some of the precious metal catalyst used can be separated off and ends up entering the general electrolyte circulation path causing problems through deposition on the zinc electrodes, as discussed previously.

It will be appreciated from the description of the particular embodiments described herein that substantially all of the reactants and products within reaction chamber 255 are in gaseous form and so catalyst 265 is not exposed to any liquid flow. Further, even if a liquid flow were present to some degree, which it is not, the design of recombinator 245 is such that gravity acts against such liquid flow to prevent it from being able to exit via recombinator outlet 260. Only a gaseous flow path is possible. This means that the likelihood of any portion of catalyst 265 being separated off and introduced into the electrolyte circulating stream is greatly reduced or eliminated since catalyst 265 can only be present in either the solid form or dissolved or otherwise carried in a liquid stream.

Therefore, in one general embodiment the present invention has provided a recombinator for a flowing electrolyte battery comprising a housing defining a reaction chamber for receiving a bromine source and a hydrogen source, and a catalyst within the reaction chamber to catalyse the formation of hydrogen bromide from the bromine source and the hydrogen source; wherein a liquid flow is prevented from entering the reaction chamber. The liquid flow (of bromine and/or electrolyte) is prevented from entering the reaction chamber by a combination of the orientation of the recombinator inlet, the use of a bromine evaporator providing entry for bromine into the recombinator inlet to ensure it is in gaseous form and a substrate for the catalyst which is heated by a heating element to substantially prevent condensation on said catalyst. The driving force for entry of gaseous components into the recombinator also ensures that reactants pass through the recombinator and outlet tube sufficiently quickly that significant amounts of condensation are avoided.

The orientation of the recombinator inlet may be any one of a number of positions so long as at least a portion of its length prevents the flow of liquid into the reaction chamber. The particular orientation will depend upon the orientation of the reaction chamber itself. In one embodiment, at least a portion of the recombinator inlet is oriented substantially at right angles to the direction of flow of reactants and products through the reaction chamber. In another embodiment, for example when the reaction chamber itself is oriented vertically, then at least a portion of the recombinator inlet will extend substantially in alignment with the direction of flow of reactants and products through the reaction chamber.

A further deficiency of prior art recombinators is that they often do not have an adequate concentration of bromine passing through the reaction chamber and contacting the catalyst. This results in limited amounts of hydrobromic acid being produced resulting in poor pH management within the battery. The provision of bromine evaporator core 215 which is in contact with a stream of bromine rich electrolyte, as described above, overcomes this problem and enables the electrolyte streams to be maintained within the optimum working pH range to improve battery efficiency and operational lifetime.

Finally, the present invention provides distinct advantages over the prior art in terms of the use of the zinc electrolyte pump as the driving force to draw reactants into recombinator 245 and reaction products out. This design means that when the zinc-bromine battery is not operational, and the zinc electrolyte pump is turned off, the flow of reactants into recombinator 245 is effectively halted and a build up of corrosive hydrobromic acid reaction product in the vicinity of catalyst 265 is prevented. This extends the lifetime of catalyst 265 and further lessens the risk of any portion of catalyst 265 finding its way into the circulating electrolyte paths.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A recombinator system for a flowing electrolyte battery comprising:
   a recombinator and a bromine evaporator;
   a housing defining a recombinator inlet, a recombinator outlet and
   a reaction chamber for receiving a halogen source and a hydrogen source; and
   a catalyst within the reaction chamber to catalyse the formation of hydrogen halide from the halogen source and the hydrogen source;
   wherein substantially all of the halogen source, hydrogen source and hydrogen halide within the reaction chamber are in gaseous form; and
   wherein the recombinator inlet and/or the recombinator outlet are oriented relative to the reaction chamber so as to prevent the flow of liquid under gravity into and/or out of the reaction chamber;
   the halogen source is a bromine source and the hydrogen halide is hydrogen bromide;
   at least a portion of the bromine source is produced by exposing a bromine containing electrolyte to the bromine evaporator, and
   wherein the bromine evaporator either i) comprises an elongate tube with a hollow interior for passage of bromine vapour and a plurality of vapour inlets for allowing for passage of bromine vapour into the interior of the bromine evaporator through the elongate tube, or ii) is at least partially enclosed by a mesh.

2. The recombinator system of claim 1 wherein the catalyst is a precious metal or precious metal alloy.

3. The recombinator system of claim 1 wherein the catalyst is supported on a substrate.

4. The recombinator system of claim 3 wherein the substrate is a porous ceramic substrate.

5. The recombinator system of claim 3 wherein the substrate is in thermal communication with a heating tube containing a heating element.

6. The recombinator system of claim 5 wherein the heating element enables catalyst temperatures of between 130° C. and 250° C. to be attained.

7. The recombinator system of claim 1 wherein the plurality of vapour inlets comprise a plurality of tube sidewall apertures and an open first end allowing for passage of bromine vapour into the elongate tube.

8. The recombinator system of claim 1 wherein the mesh is formed from a porous ceramic, glass fibres, plastic fibres or sintered plastic beads or plastic beads encased within a glass fibre sock or ceramic sleeve.

9. The recombinator system of claim 1 wherein the bromine containing electrolyte is a bromine rich electrolyte which is introduced onto the mesh enclosing the bromine evaporator.

10. The recombinator system of claim 1 wherein the recombinator inlet is in fluid communication with the hollow interior of the bromine evaporator.

11. The recombinator system of claim 1 wherein the recombinator outlet is in fluid communication with a fluid channel which returns electrolyte to a zinc electrolyte tank.

12. The recombinator system of claim 1 wherein at least a portion of the recombinator inlet extends in a direction substantially parallel to the bromine evaporator elongate tube.

13. The recombinator system of claim 1 wherein at least a portion of the recombinator inlet extends in a direction substantially at right angles to the direction of flow of reactants and products through the reaction chamber.

14. The recombinator system of claim 1 wherein at least a portion of the recombinator outlet is vertically elevated with respect to the reaction chamber.

15. The recombinator system of claim 1 wherein the bromine source and hydrogen source are drawn into the reaction chamber through the recombinator inlet and the hydrogen halide is drawn out of the reaction chamber through the recombinator outlet due to a pressure differential generated by the flow of electrolyte past an open end of the recombinator outlet.

16. The recombinator system of claim 1 wherein the flowing electrolyte battery is a zinc-bromine flowing electrolyte battery.

17. A recombinator system for a flowing electrolyte battery comprising:
a recombinator and a bromine evaporator;
a housing defining a recombinator inlet, a recombinator outlet;
a reaction chamber for receiving a halogen source and a hydrogen source;
a catalyst within the reaction chamber to catalyse the formation of hydrogen halide from the halogen source and the hydrogen source;
wherein substantially all of the halogen source, hydrogen source and hydrogen halide within the reaction chamber are in gaseous form;
the recombinator inlet and/or the recombinator outlet are oriented relative to the reaction chamber so as to prevent the flow of liquid under gravity into and/or out of the reaction chamber;
the halogen source is a bromine source and the hydrogen halide is hydrogen bromide;
a least a portion of the bromine source is produced by exposing a bromine containing electrolyte to the bromine evaporator; and
the bromine evaporator comprises an elongate tube with a hollow interior for passage of bromine vapour.

18. A recombinator system for a flowing electrolyte battery comprising:
a recombinator and a bromine evaporator;
a housing defining a recombinator inlet, a recombinator outlet and a reaction chamber for receiving a halogen source and a hydrogen source;
a catalyst within the reaction chamber to catalyse the formation of hydrogen halide from the halogen source and the hydrogen source;
wherein substantially all of the halogen source, hydrogen source and hydrogen halide within the reaction chamber are in gaseous form;
the recombinator inlet and/or the recombinator outlet are oriented relative to the reaction chamber so as to prevent the flow of liquid under gravity into and/or out of the reaction chamber;
the halogen source is a bromine source and the hydrogen halide is hydrogen bromide;
a least a portion of the bromine source is produced by exposing a bromine containing electrolyte to the bromine evaporator; and
the bromine evaporator is at least partially enclosed by a mesh.

19. The recombinator system of claim 18 wherein the mesh is formed from a porous ceramic, glass fibres, plastic fibres or sintered plastic beads or plastic beads encased within a glass fibre sock or ceramic sleeve.

20. The recombinator system of claim 18 wherein the bromine containing electrolyte is a bromine rich electrolyte which is introduced onto the mesh enclosing the bromine evaporator.

* * * * *